United States Patent
Kida et al.

(10) Patent No.: US 9,834,211 B2
(45) Date of Patent: Dec. 5, 2017

(54) COLLISON AVOIDANCE SUPPORT DEVICE AND COLLISION AVOIDANCE SUPPORT METHOD

(71) Applicant: TOYOTA JIDOSHA KABUSHIKI KAISHA, Toyota-shi, Aichi-ken (JP)

(72) Inventors: Akihiro Kida, Toyota (JP); Yoichi Iwata, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/915,053

(22) PCT Filed: Aug. 28, 2014

(86) PCT No.: PCT/IB2014/001632
§ 371 (c)(1),
(2) Date: Feb. 26, 2016

(87) PCT Pub. No.: WO2015/033196
PCT Pub. Date: Mar. 12, 2015

(65) Prior Publication Data
US 2016/0207531 A1    Jul. 21, 2016

(30) Foreign Application Priority Data
Sep. 4, 2013 (JP) ................. 2013-182761

(51) Int. Cl.
*G06F 17/10* (2006.01)
*G06G 7/78* (2006.01)
(Continued)

(52) U.S. Cl.
CPC ............ *B60W 30/09* (2013.01); *B60W 10/06* (2013.01); *B60W 10/18* (2013.01);
(Continued)

(58) Field of Classification Search
None
See application file for complete search history.

(56) References Cited

U.S. PATENT DOCUMENTS

| | | | |
|---|---|---|---|
| 8,849,515 B2* | 9/2014 | Moshchuk | B62D 15/0265 340/435 |
| 2010/0030426 A1* | 2/2010 | Okita | B60T 7/22 701/41 |
| 2012/0221236 A1 | 8/2012 | Zeller et al. | |

FOREIGN PATENT DOCUMENTS

| CN | 101641248 A | 2/2010 |
|---|---|---|
| CN | 102470876 A | 5/2012 |

(Continued)

*Primary Examiner* — Lail Kleinman
(74) *Attorney, Agent, or Firm* — Oliff PLC

(57) ABSTRACT

A vehicle (100) includes a support control unit (111) that supports avoidance of a collision with an object and a support suppressing unit (112) that suppresses the support of the support control unit (111) when a steering angle of the vehicle (100) is equal to or greater than a predetermined angle. The vehicle (100) further includes an intervention limiting unit (113) that determines whether the support suppression of the support suppressing unit (112) is necessary when the steering angle is equal to or greater than the predetermined angle on the basis of vehicle information acquired from the vehicle (100) or a running environment of the vehicle (100) and that limits intervention of the support suppression of the support suppressing unit (112) depending on the determination result.

13 Claims, 8 Drawing Sheets

(51) Int. Cl.
     *G08G 1/16*    (2006.01)
     *B60W 30/09*   (2012.01)
     *B60W 10/06*   (2006.01)
     *B60W 10/18*   (2012.01)
(52) U.S. Cl.
     CPC ..... *B60W 2540/12* (2013.01); *B60W 2540/16* (2013.01); *B60W 2540/18* (2013.01); *B60W 2710/0644* (2013.01)

(56) References Cited

FOREIGN PATENT DOCUMENTS

| | | |
|---|---|---|
| JP | H11-23706 A | 1/1999 |
| JP | 2006-250927 A | 9/2006 |
| JP | 2007-145315 A | 6/2007 |
| JP | 2014-034289 A | 2/2014 |
| KR | 10-2012-0048619 A | 5/2012 |

\* cited by examiner

COLLISION AVOIDANCE SUPPORT DEVICE AND COLLISION AVOIDANCE SUPPORT METHOD

BACKGROUND OF THE INVENTION

1. Field of the Invention

The present invention relates to a collision avoidance support device and a collision avoidance support method that support avoidance of a collision of a vehicle with an object.

2. Description of Related Art

In general, a collision avoidance support device that supports avoidance of a collision of a vehicle acquires traffic information requiring a deceleration control of a vehicle, such as crossroads, stop positions, curved roads, and an approaching of a front vehicle through the use of an in-vehicle camera or a navigation system. The collision avoidance support device performs driving supports such as a deceleration support by deceleration guidance using voice or semi-forcible application of a braking force on the basis of the acquired traffic information around the vehicle.

On the other hand, when the driving supports are frequently exercised, a driver may feel discomfort or troublesomeness from a driving support that is considered to be unnecessary. Therefore, recently, suppression of exercising of the driving support under conditions in which the necessity of the driving support is estimated to be low has been studied. For example, a device described in Japanese Patent Application Publication No. 2007-145315 (JP 2007-145315 A) determines that the necessity for exercising a driving support is low and suppresses the exercising of the driving support, when a steering angle of a vehicle is equal to or greater than a predetermined angle.

Even when the steering angle of a vehicle is equal to or greater than a predetermined angle, there is a situation in which the necessity for exercising the driving support is high. That is, if the driving support is suppressed without exception when the steering angle of a vehicle is equal to or greater than a predetermined angle, the exercising of the driving support may be suppressed in a situation in which the driving support is actually necessary. On the other hand, if the suppression of the driving support is inhibited without exception when the steering angle of a vehicle is equal to or greater than a predetermined angle, an unnecessary driving support may be exercised in actual running situations.

SUMMARY OF THE INVENTION

The present invention provides a collision avoidance support device and a collision avoidance support method that can promote appropriate adjustment of a driving support by more precisely exercising the driving support.

Means and operational advantages thereof will be described below.

According to an aspect of the present invention, there is provided a collision avoidance support device that supports avoidance of a collision of a vehicle with an object, including: a support control unit configured to perform a control of supporting avoidance of a collision; a support suppressing unit configured to suppress the support of the support control unit when a steering angle of the vehicle is equal to or greater than a predetermined angle; and an intervention limiting unit configured to determine whether a support suppression of the support suppressing unit is necessary when the steering angle is equal to or greater than the predetermined angle on the basis of vehicle information acquired from the vehicle or a running environment of the vehicle and to limit intervention of the support suppression of the support suppressing unit depending on a determination result.

According to an aspect of the present invention, there is provided a collision avoidance support method of supporting avoidance of a collision of a vehicle with an object, including the steps of: performing a control of supporting avoidance of a collision; suppressing the supporting control when a steering angle of the vehicle is equal to or greater than a predetermined angle; and determining whether a support suppression while suppressing the supporting control is necessary when the steering angle is equal to or greater than the predetermined angle on the basis of vehicle information acquired from the vehicle or a running environment of the vehicle and limiting intervention of the support suppression while suppressing the supporting control depending on a determination result.

In the device or the method, it is determined whether the suppression is necessary when the steering angle is equal to or greater than a predetermined angle. The intervention of the suppression is limited depending on the determination result. Accordingly, even when the suppression of the collision avoidance support is promoted for the reason that the steering angle is equal to or greater than the predetermined angle, this suppression is limited on the basis of the vehicle information acquired from the vehicle or the running environment of the vehicle. As a result, the suppression of the collision avoidance support based on the vehicle information or the running environment of the vehicle is performed and thus appropriate adjustment of the collision avoidance support is promoted.

The intervention limiting unit may limit the intervention of the support suppression of the support suppressing unit when a range of a shift device that instructs driving and non-driving of the vehicle is shifted from a non-driving range to a driving range.

According to this configuration, the intervention limiting unit limits the intervention of the support suppression of the support suppressing unit on condition that the range of the shift device that instructs driving and non-driving of the vehicle is shifted from the non-driving range to the driving range. That is, when the range of the shift device is shifted from the non-driving range to the driving range, the frequency in which a driver erroneously switches a shift gear to a driving range other than a desired driving range tends to be high. In this regard, by limiting the suppression of the collision avoidance support under the condition, fail-safe for the collision avoidance support is improved.

The intervention limiting unit may not limit the intervention of the control of the support suppressing unit on condition that a range of a shift device that instructs driving and non-driving of the vehicle is shifted from a non-driving range to a driving range and at least one condition of a condition in which a running distance of the vehicle after the shifting is equal to or greater than a predetermined distance and a condition in which an elapsed time after the shifting is equal to or greater than a predetermined time is satisfied.

The intervention limiting unit may not limit the intervention of the control of the support suppressing unit on condition that a range of a shift device that instructs driving and non-driving of the vehicle is shifted from a non-driving range to a driving range and at least one condition of a condition in which a running distance of the vehicle after the shifting is equal to or greater than a predetermined distance, a condition in which an elapsed time after the shifting is equal to or greater than a predetermined time, and a condition in which a running speed of the vehicle is equal to or higher than a predetermined speed is satisfied.

When the range of the shift device is set to the non-driving range, objects such as another vehicle, a store, and a wheel stopper are often present around the vehicle. The vehicle when shifted to the driving range may approach and collide with objects depending on the direction of a route. Accordingly, until the vehicle reaches the position of an object present around the vehicle when the shift device is in the non-driving range, the necessity for limiting the suppression of the collision avoidance support is high. In this regard, according to this configuration, by guaranteeing exercising of the collision avoidance support at the initial running time, a collision with an object present around the vehicle is accurately suppressed.

The shifting from the non-driving range to the driving range may be shifting from a parking gear or a neutral gear to any one of a low gear, a drive gear, and a reverse gear in the shift device of the vehicle.

According to this configuration, shifting from the parking gear or the neutral gear of the shift device of the vehicle to any one of the low gear, the drive gear, and the reverse gear is defined as the shifting from the non-driving range to the driving range. Accordingly, even when the shifting of the shift device from the parking gear or the neutral gear may be erroneously operated to any one of the low gear, the drive gear, and the reverse gear, the support for avoiding a collision of the vehicle with an object due to the erroneous operation is performed. As a result, a collision of the vehicle with an object due to an erroneous shifting operation of the shift device is suppressed on condition that the steering angle is equal to or greater than the predetermined angle.

In the configuration, a parking brake of the vehicle may be an electric parking brake that electrically switches between two states of ON and OFF states and the intervention limiting unit may not limit the intervention of the support suppression of the support suppressing unit when the electric parking brake is shifted from the ON state to the OFF state.

A parking brake of the vehicle may be an electric parking brake that electrically switches between two states of ON and OFF states and the shifting from the non-driving range to the driving range may be shifting from the ON state to the OFF state of the electric parking brake.

In the configuration, the suppression of the collision avoidance support is limited on the basis of the ON and OFF states of the electric parking brake. Accordingly, appropriate adjustment of the collision avoidance support is promoted even for a vehicle equipped with the electric parking brake. That is, even when the parking brake is switched to the ON and OFF states in plural types of operation patterns, the appropriate adjustment of the collision avoidance support is promoted. The intervention limiting unit may limit the intervention of the support suppression of the support suppressing unit when an object present within a predetermined range from the vehicle is detected.

In the configuration, when an object is present within a predetermined range of the vehicle, the suppression of the collision avoidance support by the support suppressing unit is limited. Accordingly, even when an object is present within a predetermined range of the vehicle but the steering angle is equal to or greater than a predetermined angle, the exercising of the collision avoidance support is promoted. Accordingly, the approaching to an object present around the vehicle is avoided. Even when an object is not present on the front side in the forward movement direction of the vehicle but an object is present within a predetermined range of the vehicle, the driver feels less discomfort from the exercising of the collision avoidance support in spite of the exercising of the collision avoidance support. Accordingly, it is possible to reduce discomfort of the driver and to guarantee the collision avoidance support.

The intervention limiting unit may not limit the intervention of the suppression control of the support suppressing unit on condition that at least one condition of a condition in which a predetermined time elapses after the parked or stopped vehicle starts running and a condition in which the vehicle runs a predetermined distance after the vehicle starts running is satisfied.

When a parked or stopped vehicle starts running, the frequency in which an erroneous operation is performed is high and the probability that the vehicle collides with an object present around the vehicle is high. In this regard, according to this configuration, the suppression of the collision avoidance support within a predetermined period or within a predetermined range after the parked or stopped vehicle starts running is limited. Accordingly, the exercising of the collision avoidance support in a situation in which an erroneous operation is likely to be performed is guaranteed.

The intervention limiting unit may limit the intervention of the suppression control of the support suppressing unit on condition that at least one condition of a condition in which at least one of release of a parking brake, wearing of a seat belt, turning-on of an ignition key, and turning-on of an accessory position is detected, and a condition in which a running speed of the vehicle is in a predetermined speed range is satisfied, The intervention limiting unit may not limit the intervention of the suppression control of the support suppressing unit on condition that at least one condition of a condition in which a predetermined time elapses after the at least one of the release of the parking brake, the wearing of a seat belt, the turning-on of an ignition key, and the turning-on of an accessory position is detected, a condition in which a running distance of the vehicle is equal to or greater than a predetermined distance after the at least one of the release of the parking brake, the wearing of a seat belt, the turning-on of an ignition key, and the turning-on of an accessory position is detected is satisfied.

When at least one of the release of the parking brake, the wearing of a seat belt, the turning-on of an ignition key, and the turning-on of an accessory position is detected, there is a high possibility that the parked or stopped vehicle starts running. Accordingly, in the above-mentioned configuration, by limiting the suppression of the collision avoidance support on the basis of detection of the factors, it is possible to accurately limit the suppression of the collision avoidance support when the parked or stopped vehicle starts. According to the above-mentioned configuration, it is also possible to accurately limit the suppression of the collision avoidance support until it is confirmed that a predetermined period of time elapses or the vehicle runs a predetermined distance after the vehicle starts running.

In the configuration, after when the running speed of the vehicle is less than a predetermined speed, when the running speed of the vehicle is in a predetermined speed range, the frequency in which the driver performs an erroneous operation is high and the suppression of the collision avoidance support is limited. Accordingly, the exercising of the collision avoidance support at a low speed is guaranteed.

The intervention limiting unit may not limit the intervention of the support suppression of the support suppressing unit on condition that at least one condition of a condition in which a predetermined time elapses after an ignition key is switched from an OFF state to an ON state and a condition in which the vehicle runs a predetermined distance after the ignition key is switched from the OFF state to the ON state is satisfied.

The intervention limiting unit may not limit the intervention of the support suppression of the support suppressing unit on condition that a running speed of the vehicle is equal to or greater than a predetermined running speed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

Figure 4:
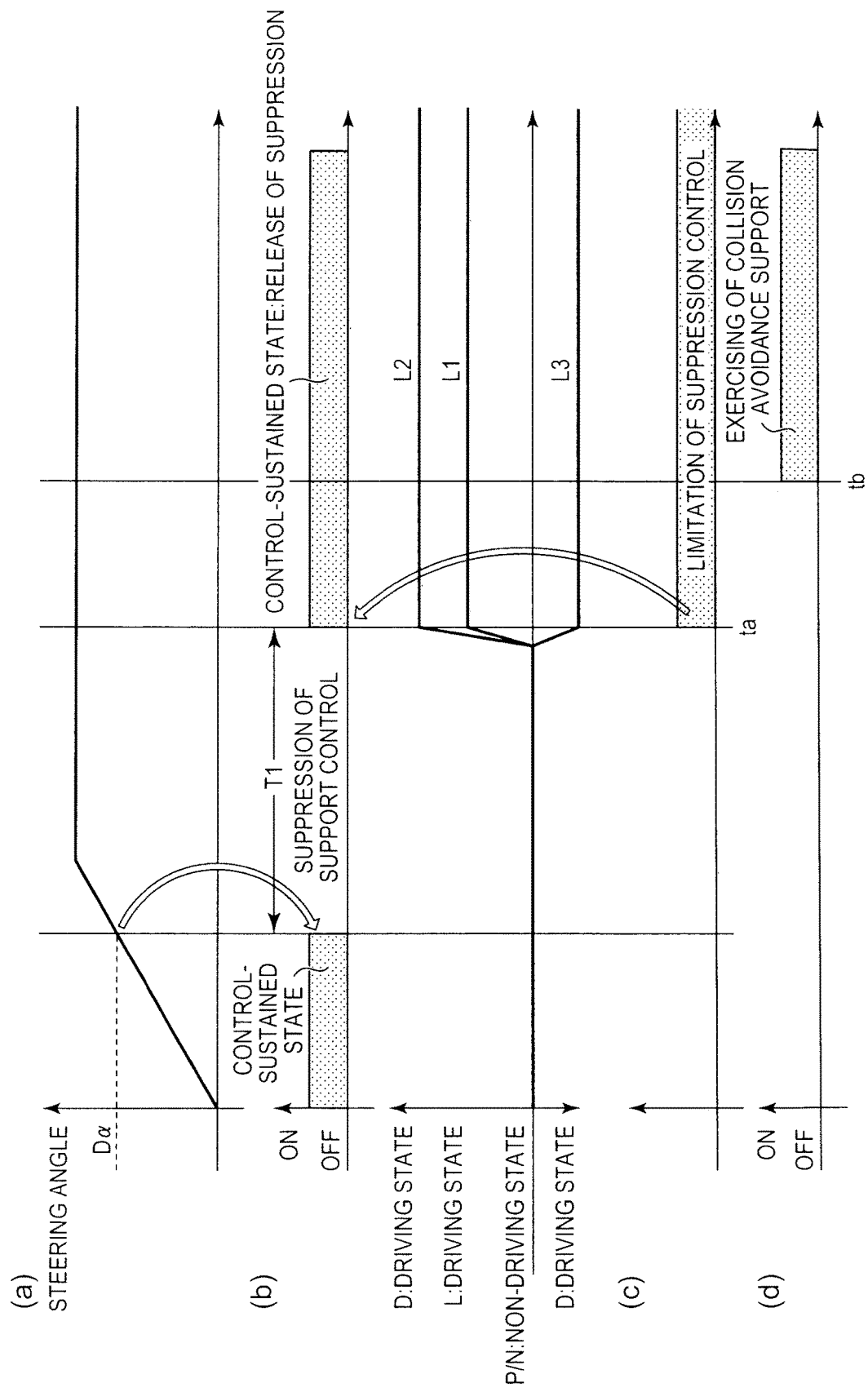
Figure 5:
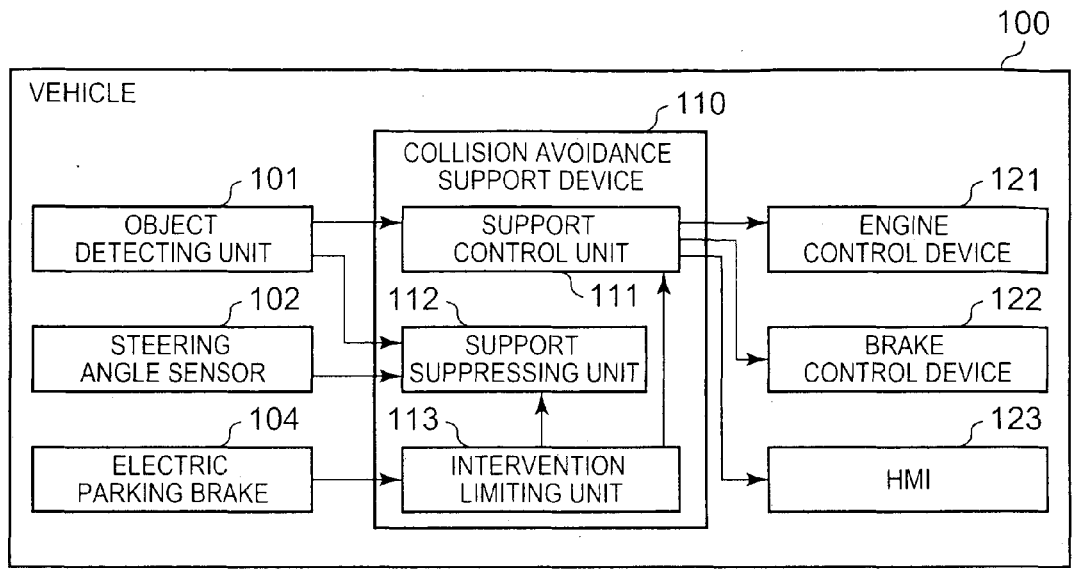
Figure 6:
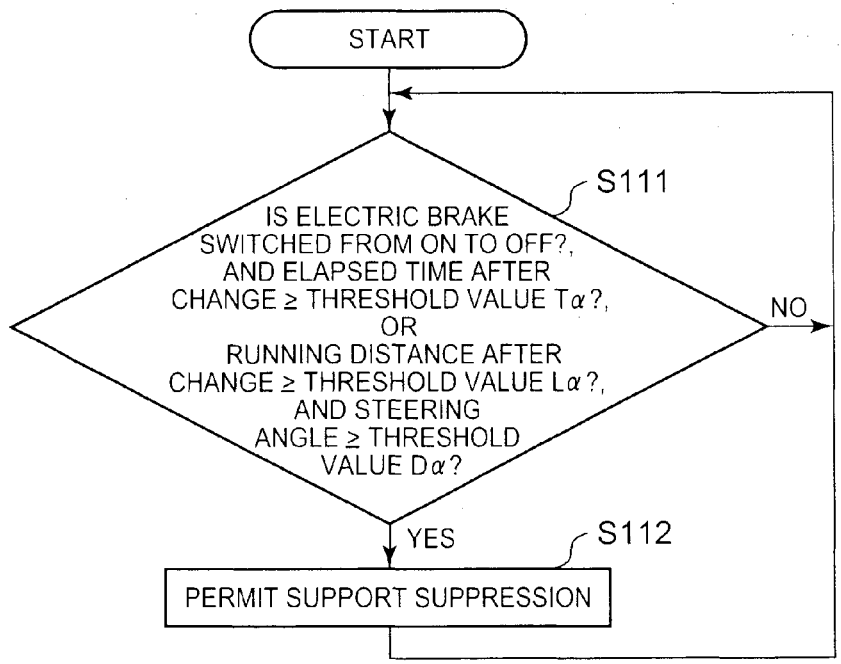
Figure 7:
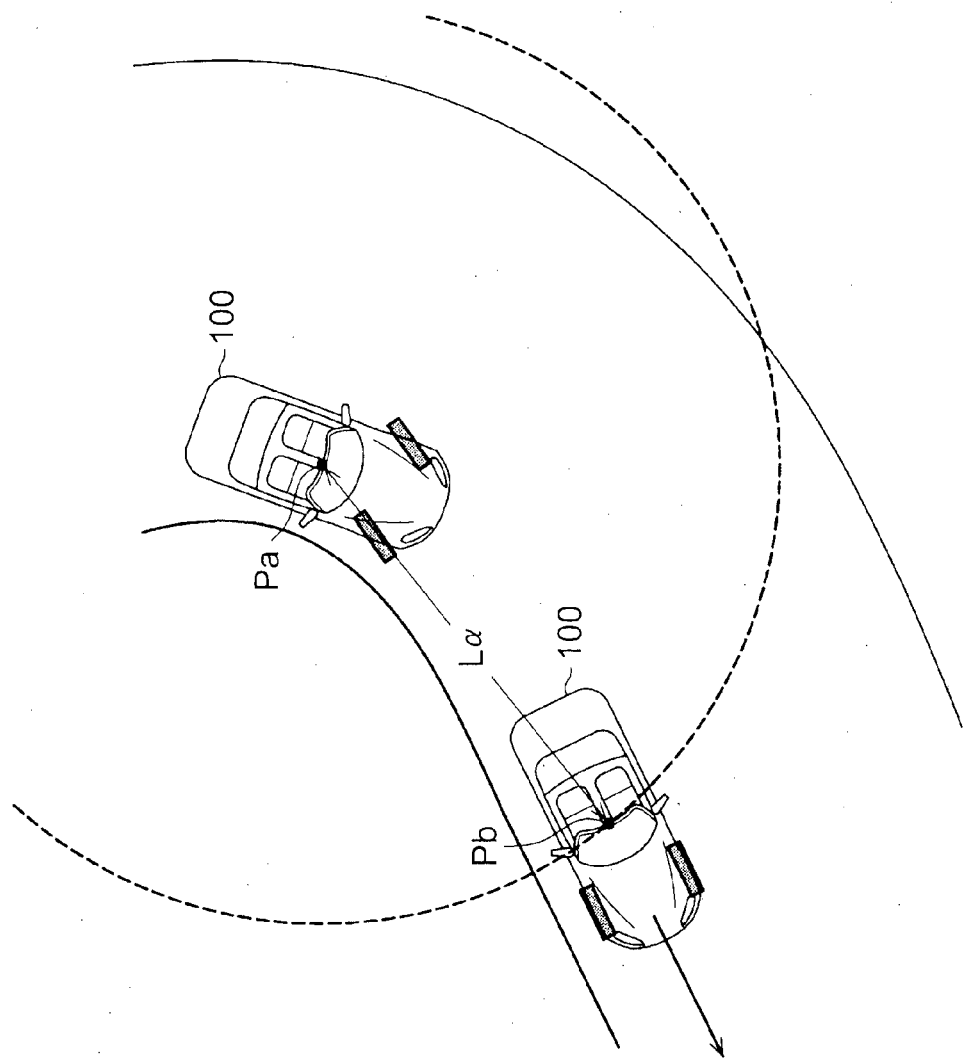
Figure 8:
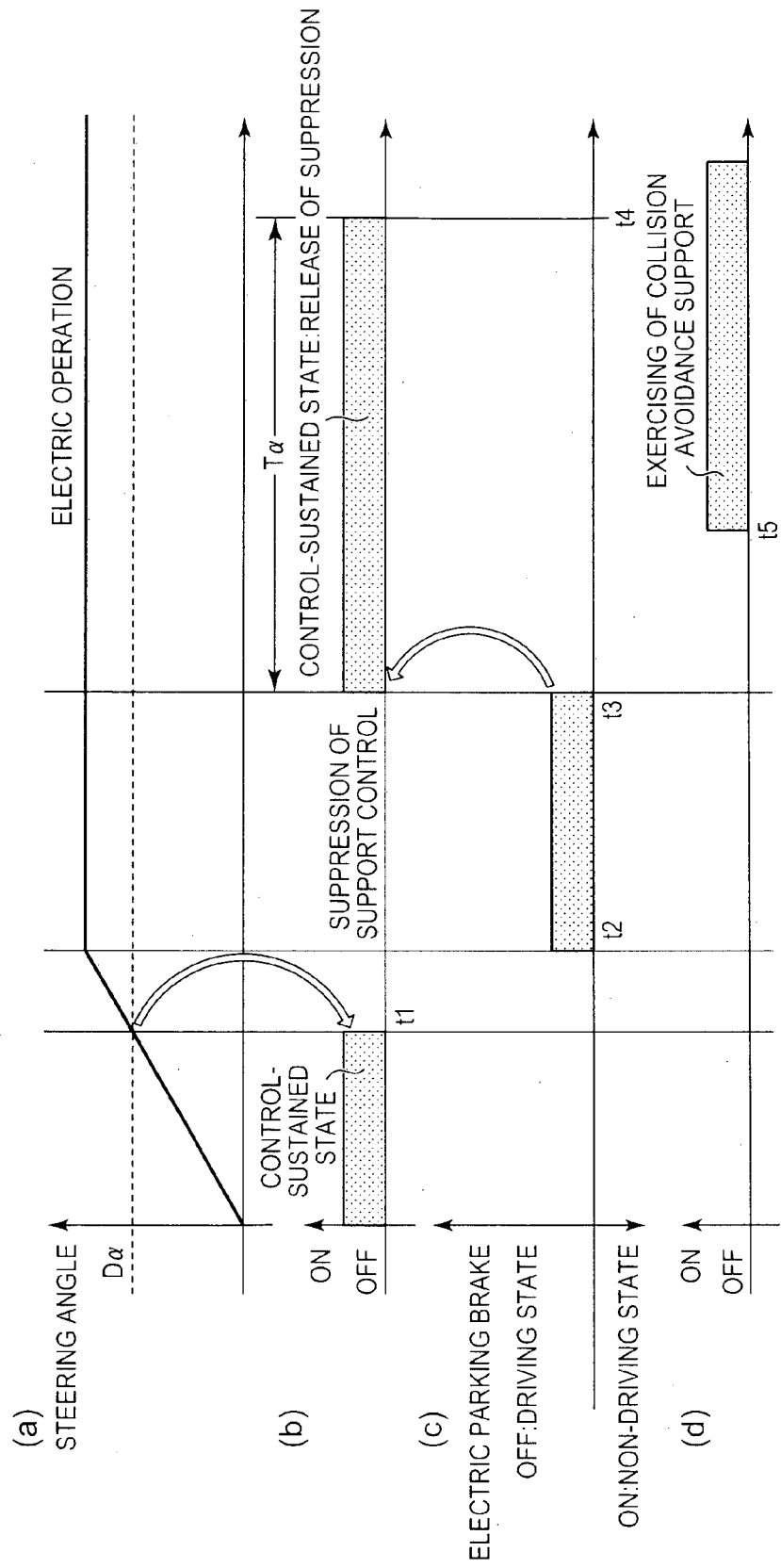
Figure 9:
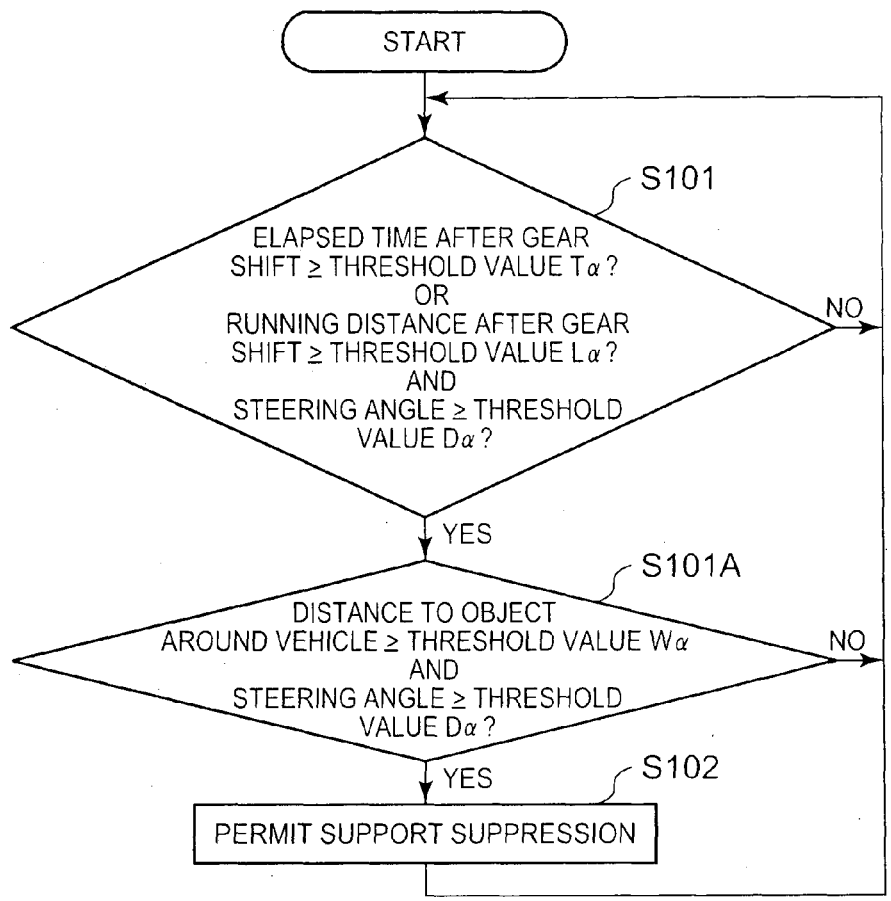
Figure 10:
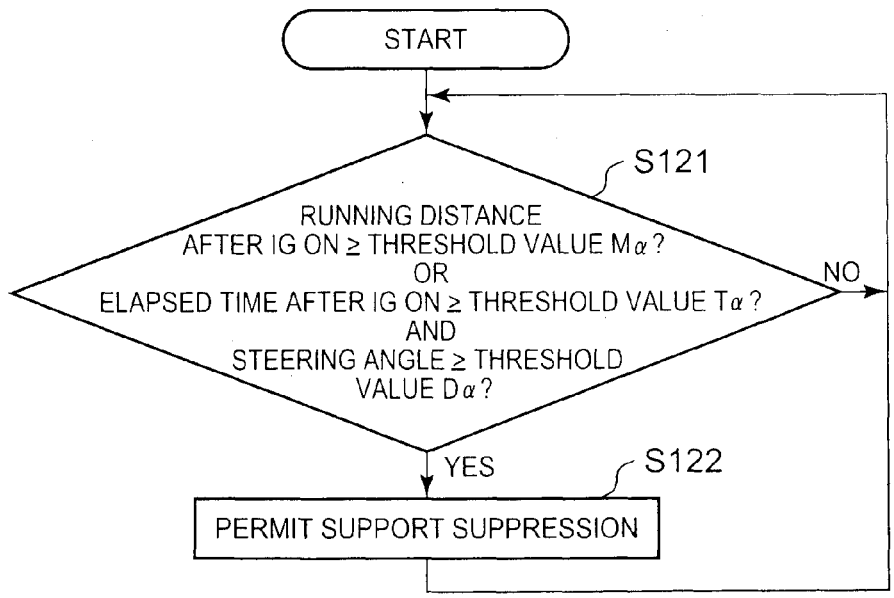
Figure 11:
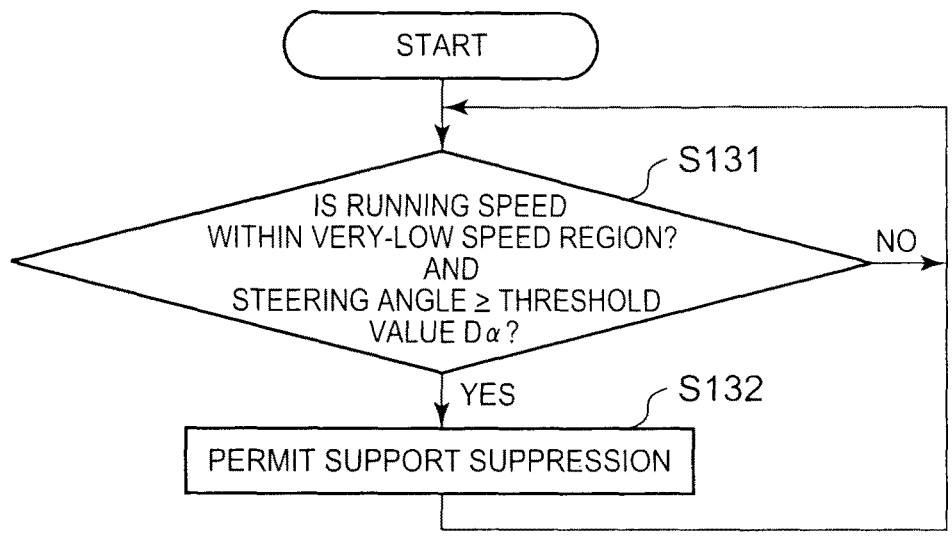
Figure 12:
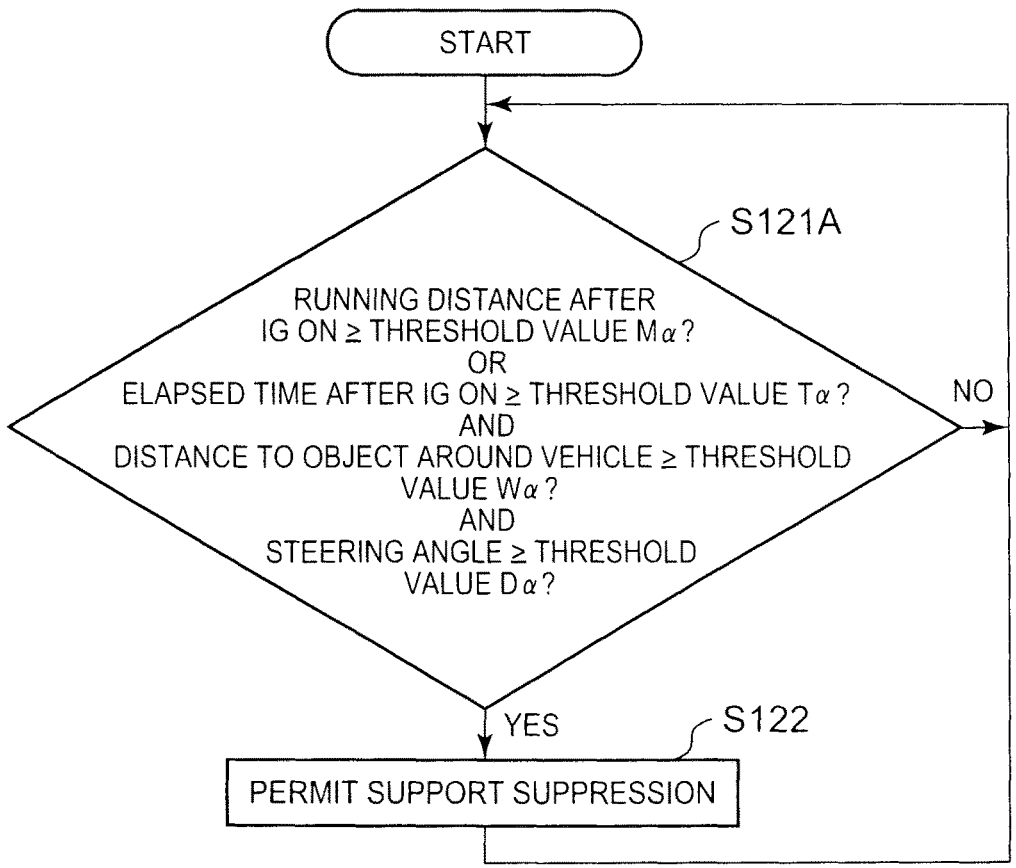

(a) to (d) of FIG. 4 are timing charts illustrating an example of a pattern of limiting the suppression of the collision avoidance support according to the first embodiment;

FIG. 5 is a block diagram schematically illustrating a configuration of a vehicle to which a collision avoidance support device and a collision avoidance support method according to a second embodiment of the present invention is applied;

FIG. 6 is a flowchart illustrating an example of a routine of limiting suppression of a collision avoidance support according to the second embodiment;

FIG. 7 is a diagram illustrating an example of parking and stopping of the vehicle that are performed when a steering angle is equal to or greater than a predetermined angle;

(a) to (d) of FIG. 8 are timing charts illustrating an example of a pattern of limiting suppression of a collision avoidance support according to the second embodiment;

FIG. 9 is a flowchart illustrating an example of a routine of limiting suppression of a collision avoidance support in a collision avoidance support device and a collision avoidance support method according to a third embodiment of the present invention;

FIG. 10 is a flowchart illustrating an example of a routine of limiting suppression of a collision avoidance support in a collision avoidance support device and a collision avoidance support method according to a fourth embodiment of the present invention;

FIG. 11 is a flowchart illustrating an example of a routine of limiting suppression of a collision avoidance support in a collision avoidance support device and a collision avoidance support method according to a fifth embodiment of the present invention; and FIG. 12 is a flowchart illustrating an example of a routine of limiting suppression of a collision avoidance support in a collision avoidance support device and a collision avoidance support method according to another embodiment of the present invention.

DETAILED DESCRIPTION OF EMBODIMENTS

First Embodiment

Hereinafter, a first embodiment in which a collision avoidance support device and a collision avoidance support method according to the present invention are embodied will be described with reference to FIGS. 1 to 4.

Figure 1:
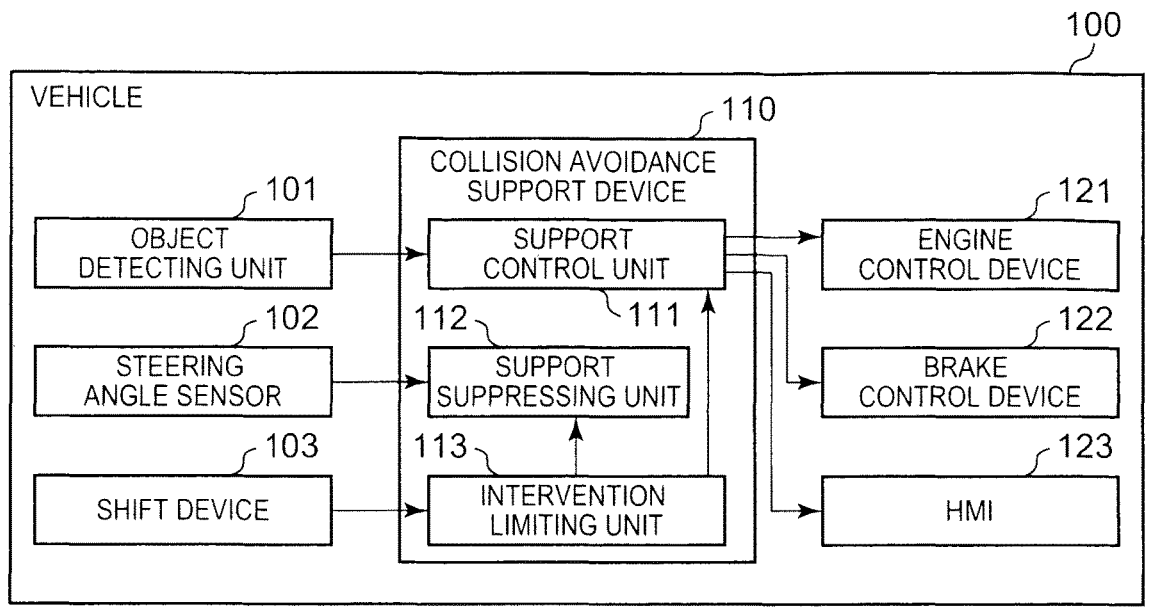
FIG. 1 is a block diagram schematically illustrating a configuration of a vehicle to which a collision avoidance support device and a collision avoidance support method according to a first embodiment of the present invention is applied.

As illustrated in FIG. 1, a vehicle to which the collision avoidance support device and the collision avoidance support method according to this embodiment are applied includes an object detecting unit 101 that detects presence of an object such as a person or a vehicle that is present around a vehicle 100 as a support target. The vehicle 100 includes a steering angle sensor 102 that detects a steering angle of the vehicle 100. The vehicle 100 includes a shift device 103 that switches a driving state and a non-driving state of the vehicle 100 in response to a driver's switching a shift gear.

The object detecting unit 101 is constituted, for example, by an ultrasonic sensor and detects presence of an object or a distance between the vehicle 100 and the object on the basis of reflection conditions of ultrasonic waves. The object detecting unit 101 outputs a signal indicating the detection result to a collision avoidance support device 110. The steering angle sensor 102 detects a steering angle varying with a driver's operation and outputs a signal indicating the detection result to the collision avoidance support device 110.

The shift device 103 detects a switching state of a shift gear and outputs a signal indicating the detection result to the collision avoidance support device 110. A neutral gear and a parking gear which correspond to the non-driving range for switching the state of the vehicle 100 to a non-driving state are defined in the shift gear. A low gear, a drive gear, and a reverse gear which correspond to the driving range for switching the state of the vehicle 100 to a driving state are defined in the shift gear. In this embodiment, information output from the shift device 103 to the collision avoidance support device 110 serves as vehicle information which is used to determine whether a collision avoidance support is necessary.

The collision avoidance support device 110 includes a support control unit 111 that performs a control of supporting avoidance of a collision and a support suppressing unit 112 that suppresses the support of the support control unit 111 on condition that the steering angle of the vehicle 100 is equal to or greater than a predetermined angle. The collision avoidance support device 110 includes an intervention limiting unit 113 that determines whether the suppression is necessary when the steering angle is equal to or greater than a predetermined angle on the basis of vehicle information acquired from the vehicle 100 or the running environment of the vehicle 100 and that limits intervention of the suppression control of the support suppressing unit 112 on the basis of the determination result. For example, a signal indicating the detection result of the object detecting unit 101, captured image data of the in-vehicle camera, and infra information are used as the vehicle information acquired from the vehicle 100. Examples of the running environment of the vehicle 100 include positional relationships between vehicles around the vehicle 100 and the vehicle 100, road environments, and presence of objects around the vehicle. The running environment is specified on the basis of a collation of a GPS and map data, analysis of captured image data of the in-vehicle camera, and identification of infrastructure information, and the like.

The support control unit 111 performs a control of avoiding a collision of the vehicle 100 with an object, for example, when the detection result of the object detecting unit 101 indicates that the object is present in the forward movement direction of the vehicle 100. The support control unit 111 performs the control of avoiding a collision of the vehicle 100 with an object, for example, when the detection result of the object detecting unit 101 indicates that the distance to the object present in the forward movement direction of the vehicle 100 is equal to or less than a predetermined distance. The support control unit 111 outputs a signal for reducing a rotation speed of an engine to an engine control device 121 as the control of avoiding the collision. The support control unit 111 outputs a signal for causing a predetermined degree of braking to automatically exercise without depending on the driver's operation of the brake control device 122, for example, to a brake control device 122 as the control of avoiding the collision. The support control unit 111 outputs a signal for performing, for example, guidance of promoting the driver to reduce the speed or guidance of causing the driver to recognize the object present around the vehicle 100 to an HMI 123 as the control of avoiding the collision.

The support suppressing unit 112 performs a suppression control of suppressing the support control of the support control unit 111 on condition that the steering angle detected by the steering angle sensor 102 is equal to or greater than, for example, a predetermined angle at which the object detecting unit 101 may easily cause erroneous detection. For example, about 180 degrees is defined as the predetermined angle. The support suppressing unit 112 suppresses the support of the support control unit 111, for example, by transmitting a suppression signal, which is a signal for releasing the support control of the support control unit 111, to the support control unit 111. When the steering angle of the vehicle 100 is equal to or greater than the predetermined angle, it has been confirmed by the inventors that an obstacle is not actually present in the forward movement direction of the vehicle but the object detecting unit 101 may easily erroneously detect an obstacle to be present in the forward movement direction of the vehicle. Accordingly, the support suppressing unit 112 performs the suppression control on condition that the steering angle of the vehicle 100 is equal to or greater than the predetermined angle.

The intervention limiting unit 113 determines whether the suppression of the collision avoidance support is necessary on the basis of the range state indicated by the detection result of the shift device 103. The intervention limiting unit 113 according to this embodiment determines that the suppression is "not necessary" until the range for controlling driving and non-driving of the vehicle 100 is shifted from the non-driving range to the driving range and a predetermined time elapses from the start of the shift. The intervention limiting unit 113 according to this embodiment determines that the suppression is "not necessary" until the range for controlling driving and non-driving of the vehicle 100 is shifted from the non-driving range to the driving range and the vehicle 100 runs a predetermined running distance from the start of the shift. That is, in this embodiment, just after the range is shifted from, the non-driving range to the driving range, that is, just after the parked or stopped state of the vehicle 100 is started, there is a high possibility that the driver of the vehicle 100 will erroneously operate an accelerator or a brake or will erroneously operate the low gear, or the driver gear, or the reverse gear of the shift gear. Therefore, in such situations, even when the steering angle is equal to or greater than the predetermined angle, it is necessary to perform the support control of the support control unit 111 and thus the intervention limiting unit 113 limits the intervention of the suppression control of the support suppressing unit 112. The limiting of the intervention of the suppression control in this embodiment also includes inhibition of the intervention of the suppression control.

The intervention limiting unit 113 limits the intervention of the suppression control of the support suppressing unit 112. In this embodiment, on the basis of the shifting of the range from the non-driving range to the driving range, it is detected that the state of the vehicle 100 is switched to the parked or stopped state to the running state.

When it is determined that the suppression is "not necessary", the intervention limiting unit 113 outputs a signal for ignoring the suppression signal of the support suppressing unit 112 to the support control unit 111. Accordingly, the support control unit 111 ignores the suppression signal and the suppression control of the support suppressing unit 112 is limited (inhibited).

When a signal for avoiding a collision is input from the support control unit 111, the engine control device 121 performs the control of reducing the rotation speed of the engine. Accordingly, the rotation speed of the engine is reduced regardless of a amount applied to an accelerator pedal by the driver.

When the signal for avoiding a collision is input from the support control unit 111, the brake control device 122 performs a control of causing the brake to automatically exercise. Since the brake of the vehicle 100 automatically exercises through the use of this control, the collision of the vehicle 100 with an object present around the vehicle 100 is avoided.

When a signal for avoiding a collision is input from the support control unit 111, the HMI 123 performs guidance for promoting the driver to reduce the speed or guidance for causing the driver to recognize the object through the use of voice or image display. A processing routine that is performed by the intervention limiting unit 113 in this embodiment will be described below with reference to FIG. 2.

Figure 2:
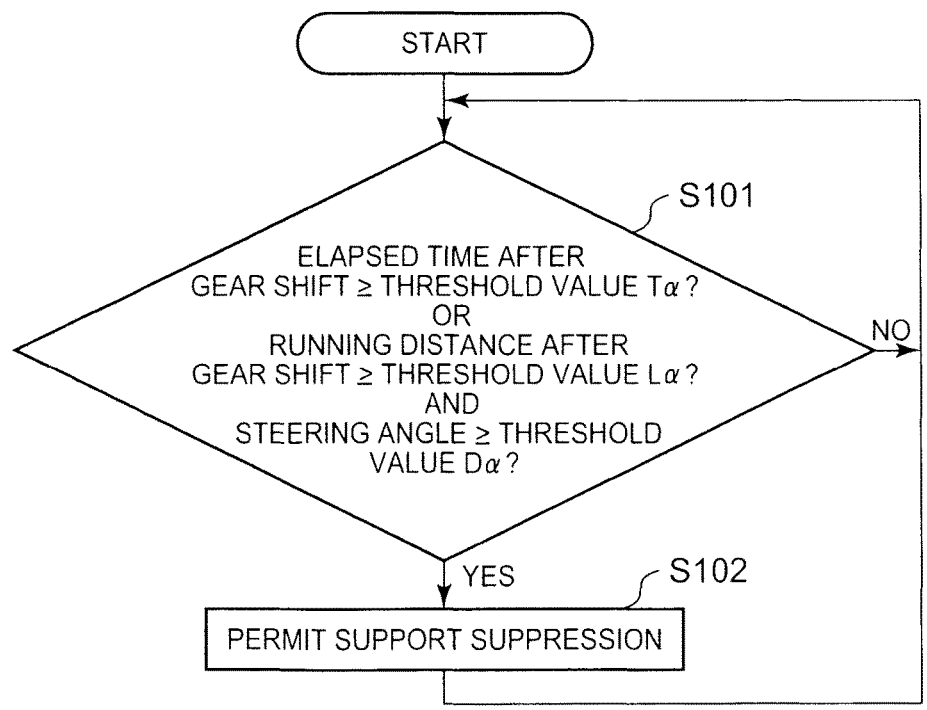
FIG. 2 is a flowchart illustrating an example of a routine of limiting suppression of a collision avoidance support according to the first embodiment.

As illustrated in FIG. 2, in step S101, it is determined whether the elapsed time after the shift gear of the vehicle 100 is shifted from the non-driving range to the driving range is equal to or greater than a threshold value Tα or whether the running distance of the vehicle 100 after the shift gear of the vehicle 100 is shifted from the non-driving range to the driving range is equal to or greater than a threshold value Lα. The threshold values Tα and Lα are set to, for example, values capable of determining whether the moving speed of the vehicle 100 departs from a very-low speed that is lower than several km/h or lower than ten or so km/h.

In step S101, it is also determined whether the elapsed time is equal to or greater than the threshold value Tα and the steering angle of the vehicle 100 is equal to or greater than a threshold value Dα for determining whether the steering angle stays in a region in which erroneous detection occurs.

When it is determined that the elapsed time is equal to or greater than the threshold value Tα and the steering angle of the vehicle 100 stays in the erroneous detection occurrence region, it is determined that the vehicle 100 runs at a speed equal to or higher than the very-low speed and the running environment of the vehicle 100 is changed from the environment of the parking or stopping, and the suppression of the collision avoidance support when the steering angle is equal to or greater than a predetermined angle is permitted (step S102).

In step S101, it is also determined whether the running distance is equal to or greater than the threshold value Lα and the steering angle of the vehicle 100 is equal to or greater than the threshold value Dα for determining whether the steering angle stays in the erroneous detection occurrence region.

Even when it is determined that the running distance of the vehicle 100 is equal to or greater than the threshold value Lα and the steering angle of the vehicle 100 stays in the erroneous detection occurrence region, it is determined that the vehicle 100 runs at a speed equal to or higher than the very-low speed and the running environment of the vehicle 100 is changed from the environment of the parking or stopping, and the suppression of the collision avoidance support when the steering angle is equal to or greater than a predetermined angle is permitted (step S102).

On the other hand, when the steering angle stays in the erroneous detection occurrence region but the elapsed time is less than the threshold value Tα or the running distance is less than the threshold value Lα, the intervention limiting unit 113 limits the intervention of the suppression control in spite of the support suppressing unit 112 determining that the suppression of the collision avoidance support is "necessary". Accordingly, when the support control unit 111 determines that the collision avoidance support is "necessary", it is determined that there is high necessity for performing the collision avoidance support and, thus the collision avoidance support is performed, regardless of the steering angle. The operations of the collision avoidance support device and the collision avoidance support method according to this embodiment will be described below with reference to FIGS. 3A to 3D and FIG. 4.

Figure 3A:
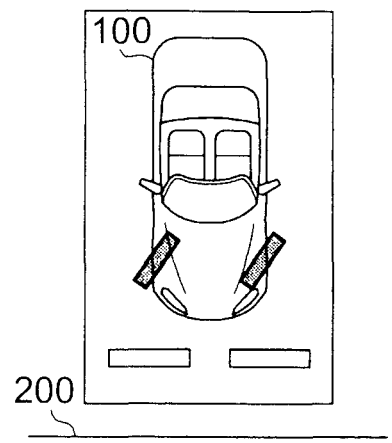
FIG. 3A is a diagram illustrating an example of parking and stopping of a vehicle that are performed when a steering angle is equal to or greater than a predetermined angle.
Figure 3B:
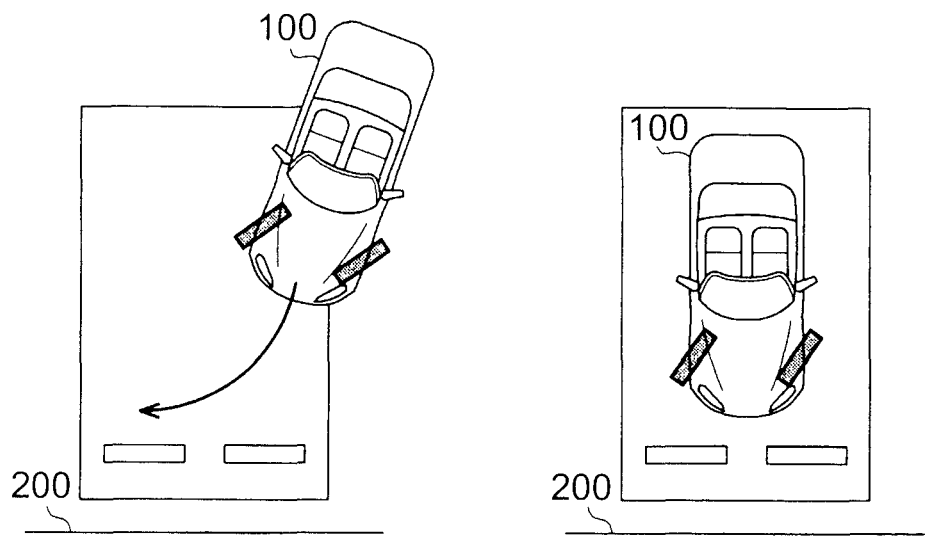
FIG. 3B is a diagram illustrating an example of parking and stopping of the vehicle that are performed when the steering angle is equal to or greater than the predetermined angle.

It is assumed that the vehicle 100 moves to a parking area for parking or stopping in a parking lot as illustrated in FIG. 3A and the vehicle 100 is parked or stopped in the parking area as illustrated in FIG. 3B. Then, the shift gear of the vehicle 100 is shifted from the drive gear or the low gear to the parking gear or the neutral gear. A wall 200 is located at a position separated forward a predetermined distance from the parking area in the forward movement direction of the vehicle 100. The presence of the wall 200 is detected, for example, by the object detecting unit 101.

At this time, the steering angle of the vehicle 100 is set to be equal to or greater than a predetermined angle as illustrated in (a) of FIG. 4. Accordingly, as illustrated as a period T1 in (b) of FIG. 4, the support suppressing unit 112 determines that the suppression is "necessary" and performs the suppression of the collision avoidance support of the support control unit 111.

Figure 3C:
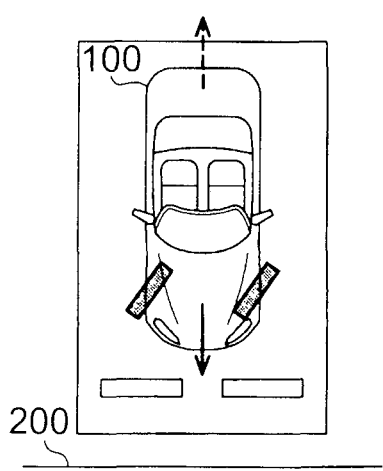
FIG. 3C is a diagram illustrating an example of parking and stopping of the vehicle that are performed when the steering angle is equal to or greater than the predetermined angle.

When the vehicle 100 starts running from the parking area as illustrated in FIG. 3C, the vehicle 100 needs to run to the rear side thereof as indicated by a dotted line, because the wall 200 is present in front of the vehicle 100. However, the driver of the vehicle 100 may erroneously shift the shift gear from the parking gear or the neutral gear to the low gear or the drive gear. In this case, the vehicle 100 moves toward the wall 200. In this way, when the vehicle 100 having been parked or stopped starts, the shift gear is switched from the non-driving range to the driving range, but there are a lot of cases that the driver erroneously operates the shift gear. That is, for example, even when the steering angle of the vehicle 100 is equal to or greater than a predetermined angle, there is high necessity for suppressing the collision of the vehicle 100 with the wall 200 through the use of the support of the support control unit 111.

Figure 3D:
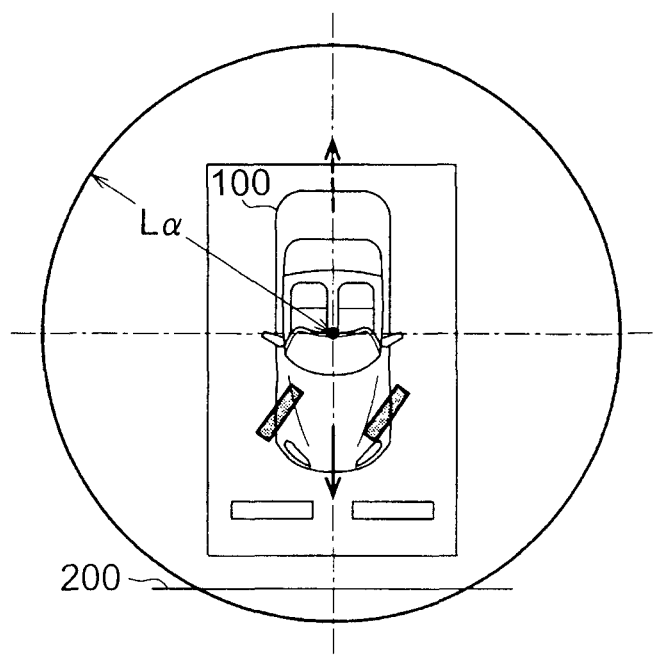
FIG. 3D is a diagram illustrating an example of parking and stopping of the vehicle that are performed when the steering angle is equal to or greater than the predetermined angle.

Therefore, in this embodiment, as illustrated in FIG. 3D, for example, after the vehicle 100 having been parked or stopped starts running, until the vehicle 100 runs a predetermined running distance Lα from the center of the parking or stopping position or until the running time Tα necessary for running the running distance Lα elapses, the suppression control of support suppressing unit 112 is suppressed (inhibited).

That is, as illustrated in (c) of FIG. 4, until the running of the predetermined running distance Lα or the elapse of the running time Tα is detected from the timing Ta at which the shift gear of the vehicle 100 is shifted from the non-driving range to the driving range, the intervention limiting unit 113 limits the intervention of the suppression control of the support suppressing unit 112.

As a result, as indicated by the timing Tb in (d) of FIG. 4, the support control unit 111 having determined that the support is "necessary" on the basis of the presence of the wall 200 performs the collision avoidance support without being suppressed by the support suppressing unit 112. Accordingly, a control for reducing the engine rotation speed or a brake control is automatically performed. For example, guidance for causing the drive to recognize the approach to the wall 200 or guidance for promoting a braking operation is performed through the use of the HMI 123. As described above, the following advantages are obtained from the collision avoidance support device and the collision avoidance support method according to this embodiment.

(1) The intervention limiting unit 113 determines whether the suppression is necessary when the steering angle is equal to or greater than the predetermined angle and limits the intervention of the suppression control of the support suppressing unit 112 depending on the determination result. Accordingly, even when the steering angle is equal to or greater than the predetermined angle and thus the support suppressing unit 112 determines that the support suppression is "necessary", the support control is performed in a situation in which there is high necessity for the support.

(2) The intervention limiting unit 113 limits the intervention of the suppression control on condition that the range of the shift device that controls driving and non-driving of the vehicle 100 is shifted from the non-driving range to the driving range and that at least one condition of the condition in which the running distance of the vehicle 100 after the shifting is equal to or greater than the predetermined distance Lα and the condition in which the elapsed time after the shifting is equal to or greater than the predetermined time Tα is satisfied. Accordingly, when an erroneous driving range is selected at the time of the running start of the parked or stopped vehicle 100, the support of the support control unit 111 is performed and thus the running of the vehicle 100 due to the erroneous operation of the driving range is suppressed.

(3) Shifting of the shift gear of the vehicle 100 from the parking gear or the neutral gear to any one of the low gear, the drive gear, and the reverse gear is defined as the shifting from the non-driving range to the driving range. Accordingly, even when the shifting from the parking gear or the neutral gear is erroneously operated to any one of the low gear, the drive gear, and the reverse gear, the support for avoiding the collision of the vehicle 100 with an object due to the erroneous operation is performed. Accordingly, A collision of the vehicle 100 with an object due to the erroneous shifting operation is suppressed when the steering angle is equal to or greater than the predetermined angle.

Second Embodiment

A collision avoidance support device and a collision avoidance support method according to a second embodiment of the present invention will be described below with reference to FIGS. 5 to 8 with a focus on differences from the first embodiment. The collision avoidance support device and the collision avoidance support method according to this embodiment has the same basic configuration as in the first embodiment, elements substantially identical to those in the first embodiment will be referenced by the same reference numerals in FIGS. 5 to 8, and description thereof will not be repeated.

As illustrated in FIG. 5, the vehicle 100 in this embodiment includes an electric parking brake 104 that is electrically switched between an ON state and an OFF state of the parking brake. The electric parking brake 104 is switched between the ON state and the OFF state of the parking brake, for example, by pressing a push switch. The electric parking brake 104 is switched from the ON state to the OFF state by stepping an accelerator pedal with a predetermined amount or more when the parking brake is in the ON state. The intervention limiting unit 113 according to this embodiment detects the starting of the vehicle 100 from the ON/OFF state of the electric parking brake 104 and limits the intervention of the suppression control of the support suppressing unit 112 on the basis of the detection result.

As illustrated as step S111 in FIG. 6, in this embodiment, when the electric parking brake 104 having been in the ON state is switched from the ON state to the OFF state by the driver's switch operating or applying a pressure to the accelerator pedal, or the like, the elapsed time or the running distance of the vehicle 100 after the switching is calculated. Then, it is determined whether the elapsed time after the switching is equal to or greater than the threshold value $T\alpha$ and the steering angle of the vehicle 100 is equal to or greater than the threshold value $D\alpha$. It is also determined whether the running distance after the switching is equal to or greater than the threshold value $L\alpha$ and the steering angle of the vehicle 100 is equal to or greater than the threshold value $D\alpha$.

When it is determined that the elapsed time after the switching is equal to or greater than the threshold value $T\alpha$ and the steering angle of the vehicle 100 is equal to or greater than the threshold value $D\alpha$ (YES in step S111), the intervention limiting unit 113 does not limit the intervention of the suppression control of the support suppressing unit 112 (step S112). Similarly, when it is determined that the running distance after the switching is equal to or greater than the threshold value $L\alpha$ and the steering angle of the vehicle 100 is equal to or greater than the threshold value $D\alpha$ (YES in step S111), the intervention limiting unit 113 does not limit the intervention of the suppression control of the support suppressing unit 112 (step S112).

On the other hand, when the steering angle is equal to or greater than the threshold value $D\alpha$ but the elapsed time after the switching of the electric parking brake 104 is less than the threshold value $T\alpha$ (NO in step S111), the intervention limiting unit 113 limits the intervention of the suppression control of the support suppressing unit 112.

When the steering angle is equal to or greater than the threshold value $D\alpha$ but the running distance of the vehicle 100 after the switching of the electric parking brake 104 is less than the threshold value $L\alpha$ (NO in step S111), the intervention limiting unit 113 limits the intervention of the suppression control of the support suppressing unit 112.

As illustrated as an example of a situation to which the collision avoidance support device and the collision avoidance support method according to this embodiment in FIG. 7, for example, when the steering angle is equal to or greater than a predetermined angle at a point Pa, the electric parking brake 104 having been in the ON state is switched from the ON state to the OFF state and the vehicle 100 runs from the point Pa to a point Pb separated by the threshold value $L\alpha$ from the point Pa.

Here, when the steering angle is equal to or greater than a predetermined value at the time of the stopping of the vehicle 100 as illustrated in (a) of FIG. 8, the support suppressing unit 112 performs the control of suppressing the collision avoidance support as illustrated as timing t1 in (b) of FIG. 8. At timing t2 the vehicle 100 stops and the electric parking brake 104 is switched from the OFF state to the ON state.

Subsequently, when the electric parking brake 104 is switched from the on state to the OFF state at timing t3 in order to cause the vehicle 100 to start running, the condition in which the steering angle is equal to or greater than the threshold value $D\alpha$ and the electric parking brake 104 is switched from the ON state to the OFF state is established ((c) of FIG. 8).

Therefore, the intervention limiting unit 113 limits the intervention of the suppression of the support suppressing unit 112, whereby the state where the collision avoidance support is suppressed is released ((b) of FIG. 8). For example, until timing t4 at which a predetermined period $T\alpha$ elapses from timing t3 comes in, the intervention of the suppression of the support suppressing unit 112 is limited. Alternatively, as illustrated in FIG. 7, until the vehicle 100 reaches the point Pb separated by the predetermined distance $L\alpha$ from the point Pa at which the vehicle 100 starts running, the intervention of the suppression of the support suppressing unit 112 is limited.

For example, even when the support control unit 111 determines that the support is "necessary" in the period $T\alpha$ but the support suppressing unit 112 determines that the suppression is "necessary", the support of the support control unit 111 is performed. Similarly, for example, even when the support control unit 111 determines that the support is "necessary" until the vehicle 100 runs the predetermined distance $L\alpha$ after the vehicle 100 starts running but the support suppressing unit 112 determines that the suppression is "necessary", the support of the support control unit 111 is performed. As described above, the following advantage instead of the above-mentioned advantage of (3) is obtained from the collision avoidance support device and the collision avoidance support method according to this embodiment.

(3A) The release of the parking or stopping of the vehicle 100 is determined on the basis of the ON/OFF state of the electric parking brake 104. The intervention limiting unit 113 limits the suppression of the collision avoidance support on the basis of the determination result. Accordingly, appropriate adjustment of the collision avoidance support is promoted even in the vehicle 100 equipped with the electric parking brake 104. As a result, even when the electric parking brake 104 is released by application of a pressure to the accelerator pedal or the like, the exercising of the collision avoidance support in a situation in which there is high necessity is guaranteed.

Third Embodiment

A collision avoidance support device and a collision avoidance support method according to a third embodiment of the present invention will be described below with reference to FIG. 9 with a focus on differences from the first embodiment. The collision avoidance support device and the collision avoidance support method according to this embodiment has the same basic configuration as in the first embodiment, elements substantially identical to those in the first embodiment will be referenced by the same reference numerals in FIG. 9, and description thereof will not be repeated.

As illustrated in FIG. 9, in this embodiment, when the condition of step S101 in FIG. 2 is established, it is determined whether the steering angle of the vehicle 100 is equal to or greater than the threshold value $D\alpha$ and whether an object such as an obstacle is present within a predetermined distance range (threshold value $W\alpha$) from the position of the vehicle 100 (step S101A). As the threshold value $W\alpha$, a value indicating a distance less than the threshold value when the support control unit 111 performs the collision avoidance support is defined.

When it is determined that an object is present within the predetermined distance range from the position of the vehicle 100 (YES in step S101) and, for example, even when the condition of step S101 is established, the suppression of the collision avoidance support of the support suppressing unit 112 is limited. That is, when the support suppressing unit 112 determines that the support is "necessary", the support for avoiding the approach of the vehicle 100 to the object is performed.

On the other hand, when it is determined in step S101A that the steering angle of the vehicle 100 is equal to or greater than the threshold value $D\alpha$ and an object such as an obstacle is not present within the predetermined distance range (threshold value $W\alpha$) from the position of the vehicle 100 (YES in step S101A), the suppression of the collision avoidance support of the support suppressing unit 112 is permitted. As described above, the following advantage can be further achieved from the collision avoidance support device and the collision avoidance support method according to this embodiment.

(4) Even when an object is present within a predetermined range of the vehicle 100, the suppression of the collision avoidance support of the support suppressing unit 112 is further limited. Accordingly, when an object is present within the predetermined range of the vehicle 100, the exercising of the collision avoidance support is promoted in spite of the situation in which the steering angle is equal to or greater than a predetermined angle. Accordingly, the approaching to an object present around the vehicle 100 is avoided. When an object is not present on the front side in the forward movement direction of the vehicle 100 but an object is present within the predetermined range of the vehicle 100, the driver feels less discomfort due to the exercising of the collision avoidance support. Therefore, it is possible to reduce the discomfort of the driver and to guarantee the collision avoidance support.

Fourth Embodiment

A collision avoidance support device and a collision avoidance support method according to a fourth embodiment of the present invention will be described below with reference to FIG. 10 with a focus on differences from the first embodiment. The collision avoidance support device and the collision avoidance support method according to this embodiment has the same basic configuration as in the first embodiment, elements substantially identical to those in the first embodiment will be referenced by the same reference numerals in FIG. 10, and description thereof will not be repeated.

As illustrated in FIG. 10, in this embodiment, it is determined in step S121 whether the elapsed time after an ignition key is switched from an OFF state to an ON state is equal to or greater than the threshold value $T\alpha$ or whether the running distance of the vehicle 100 after the ignition key is switched from the OFF state to the ON state is equal to or greater than the threshold value $L\alpha$.

It is also determined in step S121 whether the elapsed time is equal to or greater than the threshold value $T\alpha$ and the steering angle of the vehicle 100 is equal to or greater than a threshold value $D\alpha$ for determining whether the steering angle stays in the erroneous detection occurrence region.

When it is determined that the elapsed time is equal to or greater than the threshold value $T\alpha$ and the steering angle of the vehicle 100 stays in the erroneous detection occurrence region, it is determined that the vehicle 100 runs at a speed equal to or higher than a very-low speed and the running environment of the vehicle 100 is changed from the parking or stopping environment, and the suppression of the collision avoidance support when the steering angle is equal to or greater than the predetermined angle is permitted (step S122).

It is also determined in step S121 whether the running distance is equal to or greater than the threshold value $L\alpha$ and the steering angle of the vehicle 100 is equal to or greater than a threshold value $D\alpha$ for determining whether the steering angle stays in the erroneous detection occurrence region.

When it is determined that the running distance of the vehicle 100 is equal to or greater than the threshold value $L\alpha$ and the steering angle of the vehicle 100 stays in the erroneous detection occurrence region, it is determined that the vehicle 100 runs at a speed equal to or higher than a very-low speed and the running environment of the vehicle 100 is changed from the parking or stopping environment, and the suppression of the collision avoidance support when the steering angle is equal to or greater than the predetermined angle is permitted (step S122).

On the other hand, even when the steering angle stays in the erroneous detection occurrence region but the elapsed time is less than the threshold value $T\alpha$ or the running distance is less than the threshold value $L\alpha$ and the support suppressing unit 112 determines that the suppression of the collision avoidance support is "necessary", the intervention limiting unit 113 limits the intervention of the suppression control. Accordingly, when the support control unit 111 determines that the collision avoidance support is "necessary", it is determined that there is high necessity for performing the collision avoidance support regardless of the steering angle and thus the collision avoidance support is performed. As described above, the following advantage instead of the above-mentioned advantage of (3) is obtained from the collision avoidance support device and the collision avoidance support method according to this embodiment.

(3B) The release of the parking or stopping of the vehicle 100 is determined on the basis of the ON/OFF state of the ignition key of the vehicle 100. The intervention limiting unit 113 limits the suppression of the collision avoidance support on the basis of the determination result. Accordingly, it is possible to determine whether the suppression of the collision avoidance support is necessary on the basis of the ON/OFF state of the ignition key of the vehicle 100, that is, on the basis of the running start of the parked or stopped vehicle 100.

Fifth Embodiment

A collision avoidance support device and a collision avoidance support method according to a fifth embodiment of the present invention will be described below with reference to FIG. 11 with a focus on differences from the first embodiment. The collision avoidance support device and the collision avoidance support method according to this embodiment has the same basic configuration as in the first embodiment, elements substantially identical to those in the first embodiment will be referenced by the same reference numerals in FIG. 11, and description thereof will not be repeated.

In the collision avoidance support device and the collision avoidance support method according to this embodiment, it is determined whether the suppression of the collision avoidance support in a very-low speed region in consideration of the fact that the frequency in which the driver performs an erroneous operation when the running speed of the vehicle 100 is in the very-low speed region.

As illustrated in FIG. 11, in this embodiment, it is determined in step S131 whether the running speed of the vehicle 100 exceeds the very-low speed region defined as a predetermined running speed range and the steering angle is equal to or greater than the threshold value Dα. Whether the running speed belongs to the very-low speed region is determined depending on whether the running speed of the vehicle 100 is less than, for example, ten or so km/h.

When the running speed of the vehicle 100 departs from the very-low speed region and the steering angle of the vehicle 100 stays in the erroneous detection occurrence region, it is determined that the vehicle 100 runs at a speed equal to or higher than the very-low speed and the running environment of the vehicle 100 is changed from the parking or stopping environment, and thus the suppression of the collision avoidance support when the steering angle is equal to or greater than the predetermined angle is permitted (step S132).

On the other hand, even when the steering angle stays in the erroneous detection occurrence region but the running speed of the vehicle 100 belongs to the very-low speed range and the support suppressing unit 112 determines that the suppression of the collision avoidance support is "necessary", the intervention limiting unit 113 limits the intervention of the suppression control. Accordingly, when the support control unit 111 determines that the collision avoidance support is "necessary", it is determined that there is high necessity for performing the collision avoidance support regardless of the steering angle and thus the collision avoidance support is performed. As described above, the following advantage instead of the above-mentioned advantage of (3) is obtained from the collision avoidance support device and the collision avoidance support method according to this embodiment.

(3B) Depending on whether the running speed of the vehicle 100 belongs to the very-low speed region, it is determined whether the suppression of the collision avoidance support is necessary. Accordingly, it is possible to guarantee the collision avoidance support in a situation in which the frequency in which the driver performs an erroneous operation is high. The intervention limiting unit 113 can determine whether the suppression of the collision avoidance support is necessary by only monitoring the running speed and the steering angle of the vehicle 100. Accordingly, it is not necessary to measure the predetermined time or the predetermined distance and it is thus possible to achieve a decrease in computational load of the support suppressing unit 112.

Other Embodiments

The above-mentioned embodiments may be implemented in the following forms.

In the fourth embodiment, as illustrated in FIG. 12 which corresponds to FIG. 10, the intervention limiting unit 113 may determine whether the suppression of the collision avoidance support is necessary in further consideration of the distance to an object present around the vehicle 100.

In the first to fourth embodiments, until the predetermined running time elapses or until the vehicle 100 runs the predetermined running distance, the intervention limiting unit 113 limits the intervention of the suppression of the collision avoidance support. The intervention limiting unit 113 may limit the intervention of the suppression of the collision avoidance support until the predetermined running time elapses and the vehicle 100 runs the predetermined running distance.

In the second, fourth, and fifth embodiments, similarly to the third embodiment, the intervention limiting unit 113 may limit the intervention of the suppression of the collision avoidance support on the basis of the distance between an object present around the vehicle 100 and the vehicle 100.

In addition to the above-mentioned embodiments, the intervention limiting unit 113 may limit the intervention of the suppression of the collision avoidance support on condition that at least one of the release of the parking brake, the wearing of a seat belt, and the turning-on of an accessory position is detected. By employing this configuration, the advantages similar to the advantages (1) to (3) can be achieved. The intervention limiting unit 113 may not limit the intervention of the suppression of the collision avoidance support on condition that a predetermined time elapses after at least one of the release of the parking brake, the wearing of a seat belt, and the turning-on of an accessory position has been detected. Similarly, the intervention limiting unit 113 may not limit the intervention of the suppression of the collision avoidance support on condition that the vehicle 100 runs a predetermined distance after the at least one of the release of the parking brake, the wearing of a seat belt, and the turning-on of an accessory position has been detected.

The invention claimed is:

1. A collision avoidance support device that supports avoidance of a collision of a vehicle with an object, comprising:
   a processor configured to act as:
      a support control unit configured to perform a control of supporting avoidance of a collision;
      a support suppressing unit configured to suppress the support of the support control unit when a steering angle of the vehicle is equal to or greater than a predetermined angle; and
      an intervention limiting unit configured to determine whether a support suppression of the support suppressing unit is necessary, when the following conditions are satisfied:

(a) a steering angle is equal to or greater than the predetermined angle, and
(b) a running distance of the vehicle is less than a predetermined distance after detecting at least one of the following conditions:
  (i) a shift gear of the vehicle is shifted from a non-driving range to a driving range;
  (ii) release of a parking brake;
  (iii) wearing of a seat belt;
  (iv) turning-on of an ignition key; and
  (v) turning-on of an accessory position;
wherein
  the intervention limiting unit is configured to limit intervention of the support suppression of the support suppressing unit based on a result of the detection, and
  the predetermined distance is a distance enough to be determined when a running speed of the vehicle is in a very-low speed region, the very-low speed region being a speed configured for which the vehicle travels in a parking or stopping environment.

2. The collision avoidance support device according to claim 1, wherein the intervention limiting unit limits the intervention of the support suppression of the support suppressing unit when a range of a shift device that instructs driving and non-driving of the vehicle is shifted from a non-driving range to a driving range.

3. The collision avoidance support device according to claim 1, wherein the intervention limiting unit does not limit the intervention of the control of the support suppressing unit on condition that a range of a shift device that instructs driving and non-driving of the vehicle is shifted from a non-driving range to a driving range and at least one condition of a condition in which a running distance of the vehicle after the shifting is equal to or greater than a predetermined distance and a condition in which an elapsed time after the shifting is equal to or greater than a predetermined time is satisfied.

4. The collision avoidance support device according to claim 1, wherein the intervention limiting unit does not limit the intervention of the control of the support suppressing unit on condition that a range of a shift device that instructs driving and non-driving of the vehicle is shifted from a non-driving range to a driving range and at least one condition of a condition in which a running distance of the vehicle after the shifting is equal to or greater than a predetermined distance, a condition in which an elapsed time after the shifting is equal to or greater than a predetermined time, and a condition in which a running speed of the vehicle is equal to or higher than a predetermined speed is satisfied.

5. The collision avoidance support device according to claim 2, wherein the shifting from the non-driving range to the driving range is shifting from a parking gear or a neutral gear to any one of a low gear, a drive gear, and a reverse gear in the shift device of the vehicle.

6. The collision avoidance support device according to claim 1, wherein a parking brake of the vehicle is an electric parking brake that electrically switches between two states of ON and OFF states and the intervention limiting unit does not limit the intervention of the support suppression of the support suppressing unit when the electric parking brake is shifted from the ON state to the OFF state.

7. The collision avoidance support device according to claim 2, wherein a parking brake of the vehicle is an electric parking brake that electrically switches between two states of ON and OFF states and the shifting from the non-driving range to the driving range is shifting from the ON state to the OFF state of the electric parking brake.

8. The collision avoidance support device according to claim 1, wherein the intervention limiting unit limits the intervention of the support suppression of the support suppressing unit when an object present within a predetermined range from the vehicle is detected.

9. The collision avoidance support device according to claim 1, wherein the intervention limiting unit does not limit the intervention of the support suppression of the support suppressing unit on condition that at least one condition of a condition in which a predetermined time elapses after the parked or stopped vehicle starts running and a condition in which the vehicle runs a predetermined distance after the vehicle starts running is satisfied.

10. The collision avoidance support device according to claim 1, wherein the intervention limiting unit limits the intervention of the support suppression of the support suppressing unit on condition that at least one condition of a condition in which at least one of release of a parking brake, wearing of a seat belt, turning-on of an ignition key, and turning-on of an accessory position is detected, and a condition in which a running speed of the vehicle is in a predetermined speed range is satisfied, the intervention limiting unit does not limit the intervention of the support suppression of the support suppressing unit on condition that at least one condition of a condition in which a predetermined time elapses after the at least one of the release of the parking brake, the wearing of a seat belt, the turning-on of an ignition key, and the turning-on of an accessory position is detected, and a condition in which a running distance of the vehicle is equal to or greater than a predetermined distance after the at least one of the release of the parking brake, the wearing of a seat belt, the turning-on of an ignition key, and the turning-on of an accessory position is detected is satisfied.

11. The collision avoidance support device according to claim 1, wherein the intervention limiting unit does not limit the intervention of the support suppression of the support suppressing unit on condition that at least one condition of a condition in which a predetermined time elapses after an ignition key is switched from an OFF state to an ON state and a condition in which the vehicle runs a predetermined distance after the ignition key is switched from the OFF state to the ON state is satisfied.

12. The collision avoidance support device according to claim 1, wherein the intervention limiting unit does not limit the intervention of the support suppression of the support suppressing unit on condition that a running speed of the vehicle is equal to or greater than a predetermined running speed.

13. A collision avoidance support method of supporting avoidance of a collision of a vehicle with an object, comprising:
  performing a control of supporting avoidance of a collision;
  suppressing the supporting control when a steering angle of the vehicle is equal to or greater than a predetermined angle; and
  determining whether a support suppression while suppressing the supporting control is necessary when the following conditions are satisfied:
    (a) a steering angle is equal to or greater than the predetermined angle, and (b) a running distance of the vehicle is less than a predetermined distance after detecting at least one of the following conditions:
  (i) a shift gear of the vehicle is shifted from a non-driving range to a driving range;
  (ii) release of a parking brake;
  (iii) wearing of a seat belt;
  (iv) turning-on of an ignition key; and
  (v) turning-on of an accessory position;
wherein
  the intervention limiting unit is configured to limit intervention of the support suppression of the support suppressing unit based on a result of the detection, and
  the predetermined distance is a distance enough to be determined when a running speed of the vehicle is in a very-low speed region, the very-low speed region being a speed configured for which the vehicle travels in a parking or stopping environment.

* * * * *